(12) United States Patent
Weber

(10) Patent No.: US 7,765,356 B2
(45) Date of Patent: Jul. 27, 2010

(54) SYSTEM FOR MODIFYING DATA IN A BUS BUFFER

(75) Inventor: George Weber, Indianapolis, IN (US)

(73) Assignee: Raytheon Company, Waltham, MA (US)

( * ) Notice: Subject to any disclaimer, the term of this patent is extended or adjusted under 35 U.S.C. 154(b) by 462 days.

(21) Appl. No.: 11/381,081

(22) Filed: May 1, 2006

(65) Prior Publication Data

US 2007/0239923 A1    Oct. 11, 2007

Related U.S. Application Data

(60) Provisional application No. 60/791,544, filed on Apr. 11, 2006.

(51) Int. Cl.
*G06F 13/36* (2006.01)

(52) U.S. Cl. .................. 710/314; 710/4; 370/382

(58) Field of Classification Search .......... 710/6, 710/31, 36, 38, 52, 100, 305, 314, 4; 370/401, 370/380, 217, 381–382; 707/202; 714/4, 714/7, 13
See application file for complete search history.

(56) References Cited

U.S. PATENT DOCUMENTS

| | | | |
|---|---|---|---|
| 5,132,987 A | 7/1992 | Motohashi et al. .......... 375/3 |
| 5,181,201 A | 1/1993 | Schauss et al. .......... 370/85.1 |
| 5,202,593 A | 4/1993 | Huang et al. .......... 307/475 |
| 5,223,788 A | 6/1993 | Andreano et al. .......... 324/158 |
| 5,229,538 A | 7/1993 | McGlynn et al. .......... 89/1.56 |
| 5,414,347 A | 5/1995 | Monk et al. .......... 324/73.1 |
| 5,931,874 A | 8/1999 | Ebert et al. .......... 701/1 |
| 5,992,290 A * | 11/1999 | Quebedeaux et al. ........ 89/1.56 |
| 6,122,569 A * | 9/2000 | Ebert et al. ............ 701/3 |
| 6,212,224 B1 | 4/2001 | Cammarota et al. ........ 375/219 |
| 6,894,505 B2 | 5/2005 | Gohel .......... 324/539 |
| 6,925,054 B1 * | 8/2005 | Atterton et al. ............ 370/218 |
| 6,985,482 B2 * | 1/2006 | Suzuki .......... 370/380 |
| 6,995,658 B2 * | 2/2006 | Tustison et al. ............ 375/219 |
| 7,002,971 B1 * | 2/2006 | Enns et al. .......... 370/401 |
| 7,007,042 B2 * | 2/2006 | Lubbers et al. ............ 707/202 |
| 7,131,089 B2 * | 10/2006 | Issa et al. .......... 716/6 |
| 7,142,982 B2 * | 11/2006 | Hickenlooper et al. ...... 701/213 |
| 7,162,653 B2 * | 1/2007 | Mares et al. .......... 713/310 |
| 7,583,667 B2 * | 9/2009 | Adhikari et al. ............ 370/389 |
| 2003/0033059 A1 | 2/2003 | Ebert et al. .......... 701/3 |
| 2004/0205285 A1 | 10/2004 | Kinstler .......... 710/315 |
| 2005/0271076 A1 * | 12/2005 | Ganti et al. .......... 370/448 |
| 2006/0020720 A1 | 1/2006 | Stallmo et al. .......... 710/36 |

OTHER PUBLICATIONS

*Notification of Transmittal of the International Search Report and the Written Opinion of the International Searching Authority, or the Declaration* for International Application No. PCT/US2007/007647; 14 pages, Apr. 16, 2008.

(Continued)

*Primary Examiner*—Clifford H Knoll
(74) *Attorney, Agent, or Firm*—Baker Botts L.L.P.

(57) ABSTRACT

According to one embodiment of the invention, a data modifying bus buffer generally includes a switch that is configured to selectively couple a first databus to a second databus. The switch is controlled by a buffer controller. The first databus and a second databus have a similar predetermined protocol. The buffer controller is operable to monitor the first databus for the presence of a particular sequence of the signals such that, when the particular sequence of the signals is found, the first switch may be selectively opened or closed.

12 Claims, 3 Drawing Sheets

OTHER PUBLICATIONS

*Government of Pakistan, Intellectual Property Organization, The Patent Office, Karachi; Examination Report*; Patent Application No. 404/2007; 2 pages, Jun. 16, 2009.

*European Patent Office Communication Pursuant to Article 94(3) EPC*; Application No. 07 861 276.9-2212; 3 pages, Sep. 21, 2009.

* cited by examiner

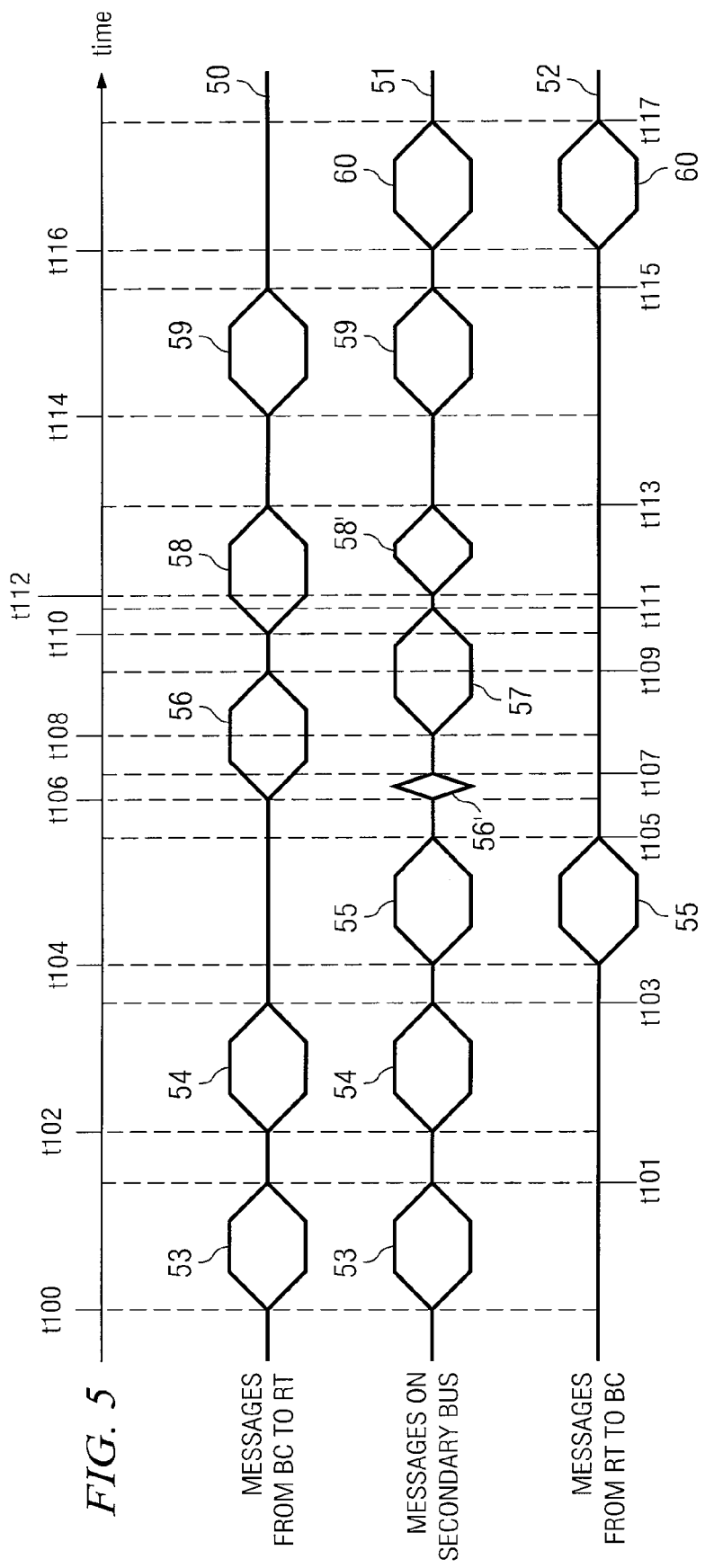

SYSTEM FOR MODIFYING DATA IN A BUS BUFFER

CROSS-REFERENCE TO RELATED APPLICATIONS

This application claims priority under 35 U.S.C. §119(e) to provisional application entitled "Data Modifying Bus Buffer", U.S. Ser. No. 60/791,544, which was filed on Apr. 11, 2006 by the same Applicant.

FIELD OF THE INVENTION

This invention relates to databuses, and more particularly, to a data modifying bus buffer.

BACKGROUND OF THE INVENTION

The advent of electronic computing systems has automated communication and control of differing types of peripheral devices that were previously implemented using manual controlling methods. Principal among these are military vehicles such as aircraft that may each have a multitude of peripheral devices for aiding navigation, enabling reconnaissance, weaponry deployment, tactical sensory devices, and the like. Because each of these peripheral devices may be deployed at various locations on the aircraft, databuses having commonly accepted protocols, such as the MIL-STD-1553 protocol, have been developed to enable communication and control of these devices from a mission computer, the functionality of which is accessible by the pilot of the aircraft. Executable software residing on the mission computer is defined by an operational flight program (OFP), which is responsible for communicating with and controlling each of the peripheral devices. Nevertheless, once initially designed, the addition of new peripheral devices onto a MIL-STD-1553 databus typically requires extensive regression testing in order to ensure that the core functionality of the operational flight plan is not adversely affected.

SUMMARY OF THE INVENTION

According to one embodiment of the invention, a data modifying bus buffer generally includes a switch that is configured to selectively couple a first databus to a second databus. The switch is controlled by a buffer controller. The first databus and a second databus have a similar predetermined protocol. The buffer controller is operable to monitor the first databus for the presence of a particular sequence of the signals such that, when the particular sequence of the signals is found, the first switch may be selectively opened or closed.

According to another embodiment of the present invention, a method for modifying a particular data signal transferred from a first databus of a vehicle to a second databus of an associated peripheral device includes the acts of monitoring the first databus for the presence of the particular data signal. The particular data signal comprises a header portion and an original data portion. In response to finding the particular data signal, a modified data signal is transferred to the second databus. The modified data signal includes the header portion and a modified data portion. The modified data portion contains information that has been modified from the original data portion.

Some embodiments of the present invention may provide numerous technical advantages. A technical advantage of one embodiment may include the ability to add functionality to a network having a databus in a relatively easy and cost effective manner. The data modifying bus buffer is capable of automatically modifying selective messages that are transferred from a controlling device, such as a mission controller to any peripheral device, thereby alleviating the necessity of changing the operational flight plan to perform such behavior. Thus, additional peripheral devices may be configured on a databus, such as a MIL-STD-1553 databus, in order to enhance the utility of the databus due to continually changing needs.

While specific advantages have been disclosed hereinabove, it will be understood that various embodiments may include all, some, or none of the disclosed advantages. Additionally, other technical advantages not specifically cited may become apparent to one of ordinary skill in the art following review of the ensuing drawings and their associated detailed description

BRIEF DESCRIPTION OF THE DRAWINGS

The present invention, as defined in the claims, can be better understood with reference to the following drawings, wherein:

FIG. 5 is a timing diagram indicating a sequence of messages that may be transferred through the embodiment of FIG. 3.

DETAILED DESCRIPTION

Figure 1:
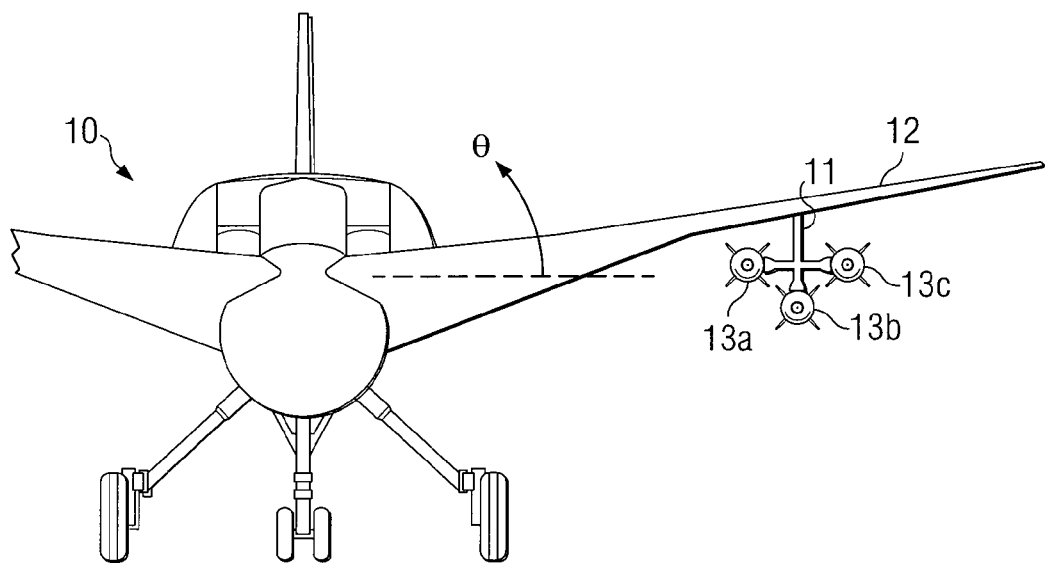
FIG. 1 is a partial front elevational view of an aircraft implementing one embodiment of a data modifying bus buffer according to the present invention.

Referring now to FIG. 1 of the drawings, a partial view of an aircraft 10 is shown having a triple ejector rack 11 mounted onto one wing 12 of the aircraft 10. The triple ejector rack 11 is a type of bomb release unit, which may be adapted to mount one or more weapons in various physical configurations. The triple ejector rack 11 provides an advantage over other types of bomb release units having only one or two weapon mounts in that more armament may be carried and/or delivered to its respective destination during any particular mission of the aircraft. Additionally, the triple ejector rack 11 may be deployed with missiles, dumb bombs, or smart bombs, such as the joint direct attack munition, or joint standoff weapon type smart bombs. Smart bombs differ from dumb bombs in that geographical or other spatial coordinate information may be programmed into the smart bomb. This enables controlling circuitry within the smart bomb to pinpoint its target with greater accuracy than typically achieved with dumb bombs.

The triple ejector rack 11 enables mounting of up to three stores or weapons 13, wherein one weapon 13b is adapted to depend from underneath the triple ejector rack 11 and the other two weapons 13a and 13c are adapted for mounting to either side of the triple ejector rack 11. This type of physical configuration possesses a significant drawback when used in conjunction with weapons. Namely, smart weapons need access to locational data as well as orientational data of the aircraft in order for the weapon to properly access its intended target. Thus, the triple ejector rack 11 as shown in FIG. 1 presents a problem wherein each weapon (13a, 13b, and 13c)

is disposed on the triple ejector rack 11 at differing angles relative to the roll angle θ of the aircraft 10.

The roll angle θ of the aircraft 10 is defined generally as the angular orientation of the main wing 12 of the aircraft relative to the horizontal plane of the Earth. As shown in FIG. 1, the aircraft 10 is in a generally upright orientation thereby forming a roll angle θ of 0 degrees. Weapons 13a, 13b, and 13c are disposed on the triple ejector rack 11 at 270, 180, and 90 degrees relative to the roll angle θ of the aircraft respectively. Given an instantaneous roll angle θ of the aircraft of 0 degrees, the weapons 13a, 13b, and 13c are each disposed on the triple ejector rack 11 at 270, 180, and 90 degrees respectively relative to the horizontal plane of the Earth. Therefore, it has been discovered that a need exists for correcting roll angle θ information transferred to each weapon 13 such that the weapon 13 may properly access and strike its intended target.

Figure 2:
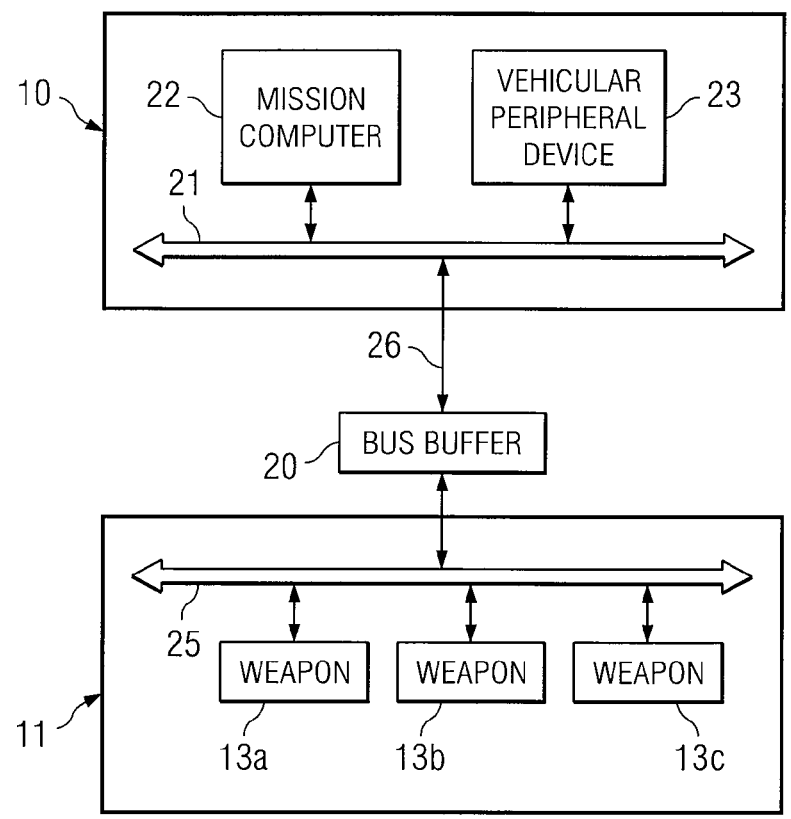
FIG. 2 is a block diagram indicating the implementation of the embodiment of FIG. 1 that is coupled to an avionics databus and a weapons pod databus of the aircraft.

FIG. 2 shows one embodiment that may provide a solution to this need. This embodiment uses a data modifying bus buffer 20 that is operable to modify a portion of particular messages originating from a first databus 21 and are destined for at least one peripheral device such as a weapon 13 coupled to a second databus 25. In one embodiment, the first databus 21 may be disposed within the aircraft 10 and the second databus 25 may be disposed within the triple ejector rack 11. In this embodiment, data modifying bus buffer 20 may intercept messages containing roll angle θ information that is being transferred from the aircraft 10 to the weapon 13. Once intercepted, a rotational offset value may be combined with the roll angle θ information in order to form a modified data portion, which may then be transferred to the weapon 13. In this manner, each weapon (13a, 13b, and 13c) on a triple ejector rack 11 may each continually maintain concise roll angle θ information of its respective roll angle position relative to the earth. Although the present embodiment describes the selective modification of one particular type of message, it will be appreciated that the data modifying bus buffer 20 may be adapted to modify a portion of any type of message or packet that is transferred between intercoupled databuses for use by any type of peripheral device.

A first databus 21 may be coupled to a mission computer 22 that administers data transfers with at least one first databus coupled peripheral device 23 coupled to the first databus. In one embodiment, the first databus 21 is a MIL-STD-1553 or similar type databus suitable for controlling various peripheral devices disposed on the aircraft. Although not by way of limitation, these peripheral devices 23 may include a stores management system, an embedded global positioning system inertial navigation system, a control display unit, a central air data computer, TGP radar or targeting pod, a radar warning receiver, such as the Air Force's ALR-69 radar system, and counter measures dispense system, to name a few.

A second databus 25 may be coupled to one or more peripheral devices such as weapons 13a, 13b, and 13c. In one embodiment, the databus is a MIL-STD-1553 or similar type databus that is configured on a weapons pod, such as the triple ejector rack 11. According to the MIL-STD-1553 protocol, the peripheral devices 13 may be each configured as a remote terminal (RT). In another embodiment, the peripheral devices 13 are weapons.

According to the present embodiment as shown in FIG. 2, the first databus 21 is coupled to the second databus 25 via a data modifying bus buffer 20. The data modifying bus buffer 20 is configured to transfer and receive messages between the mission computer 22 to any peripheral device 13. In a first databus 21 that is implemented on an aircraft 10, the mission computer 22 may be disposed within the fuselage of the aircraft 10, and the bus buffer 20 may be housed within the weapons pod 11. Given this configuration, coupling of the first databus 21 to the bus buffer 20 may be provided by a cable 26 having significant length. To remedy any potential problems inherent in these substantially elongated cables 26, the bus buffer 20 may comprise circuitry to re-condition the electrical signals transferred to and from the first 21 and second 25 databuses as well as to decrease inherent loading on the first databus 21 that may occur due to multiple peripheral devices 13 coupled to the second databus 25. However, in other embodiments, this re-conditioning circuitry may not be included if electrical buffering between the first and second databuses is not needed or desired.

Figure 3:
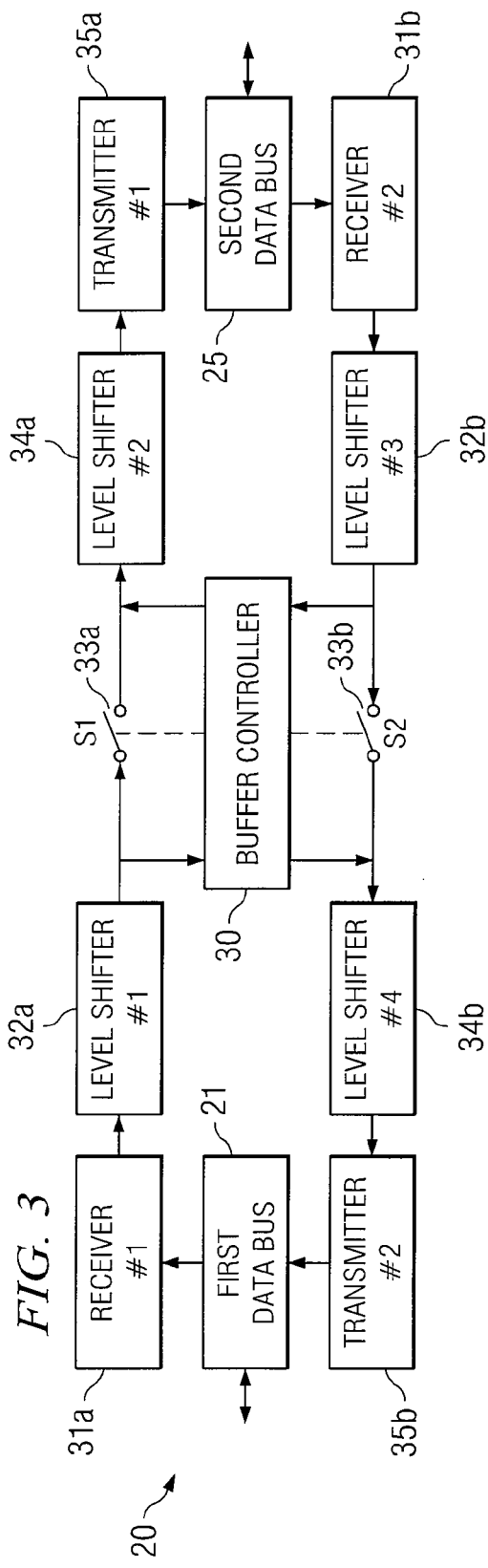
FIG. 3 is a block diagram of several components of the embodiment of a data modifying bus buffer of FIG. 1.

A block diagram depicting several components of one embodiment of the data modifying bus buffer 20 are shown in FIG. 3. The data modifying bus buffer 20 may have a buffer controller 30 that is operable to monitor and control the flow of messages through the data modifying bus buffer 20. The data modifying bus buffer 20 may be bi-directional in that messages may be transferred from the first databus 21 to the second databus 25 or from the second databus 25 to the first databus 21. For transferring messages from the first databus 21 to the second databus 25, a receiver 31a is provided that receives signals according to the given protocol constraints of the first databus 21. In the embodiment in which the first databus 21 has a protocol compliant with the MIL-STD-1553 standard, the receiver 31a is configured to accept Manchester II, bi-polar type signals. In order to convert these bi-polar signals to single-ended signals for use by the buffer controller 30, a first level shifter 32a is included that is coupled between the receiver 31a and the buffer controller 30. Following the processing of signals from the first databus 21, a second level shifter 34a is included to convert the single-ended signals back to, in this example, Manchester type, bi-polar signals, and then the signals are transmitted onto the second databus 25 via a transmitter 35a. A switch 33a couples the first level shifter 32a to the second level shifter 34a. Switch 33a selectively transfers messages comprising signals from the first databus 21 directly to the second databus 25, thereby defining an original path through the data modifying bus buffer 20. The flow of messages from the second databus 25 to the first databus 21 is provided by a receiver 31b, first level shifter 32b, switch 33b, second level shifter 34b, and transmitter 35b, which operate in generally the same manner as the receiver 31a, first level shifter 32a, switch 33a, second level shifter 34a, and transmitter 35a, respectively.

As mentioned previously, the data modifying bus buffer 20 is operable to monitor messages that are transferred from the first databus 21 to the second databus 25 in order to detect the presence of a particular type of message and modify this particular message in any suitable manner. For example, orientational information including roll angle θ information may be transmitted to the weapons pod 11 from the mission computer 21 in the form of a message having a header portion and a data portion. According to MIL-STD-1553 protocol, the header portion comprises a command word that may contain address information of the particular peripheral device 13 and a message type information relating to the type of data contained within a plurality of data words included in the message. The buffer controller 30, which is coupled to first level shifter 32a, continually monitors the messages that flow through the data modifying bus buffer 20 in order to detect the presence of a particular message that is destined for a weapon 13 coupled to the second databus 25 and having a message type indicating that the data portion contains roll angle θ information. If this type of message is encountered, the bus controller 30 causes switch 33a to open thereby causing the particular message to be transferred through the bus controller 30, thereby defining an alternate path. The buffer controller 30 is operable to open switch 33b due to a collision between the signals existing simultaneously on the first databus 21 and the second databus 25. The switch 33a may comprise any physical or solid-state device that selectively creates an open circuit or closed circuit condition between the first level shifter 32a and the second level shifter 34a. In one embodiment, the switch may be a transistor, such as a field effect transistor (FET) or a bipolar transistor. Although the embodiment described above is implemented on a first and second databus having a MIL-STD-1553 protocol, other embodiments may be implemented on databuses having any protocol.

Figure 4:
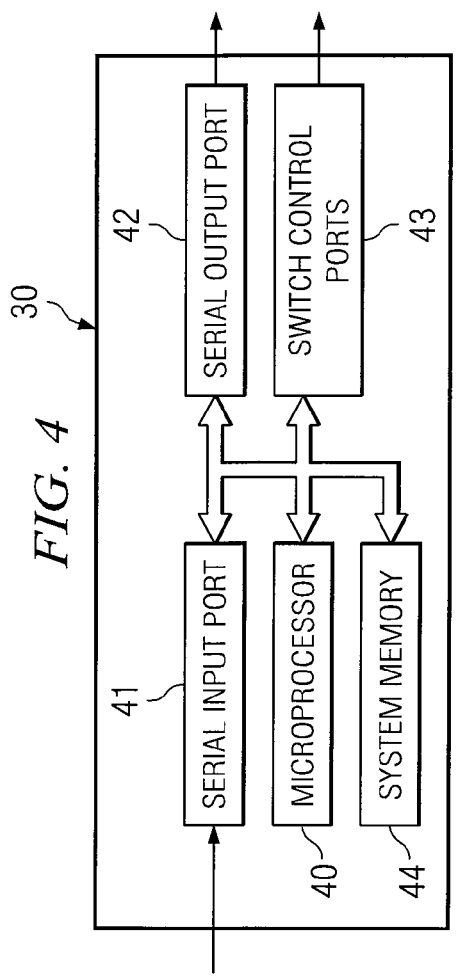
FIG. 4 is a block diagram of several components of the buffer controller of the embodiment of FIG. 3.

FIG. 4 shows several components of the bus controller 30, which generally comprises a microprocessor 40 that controls a serial input port 41, a serial output port 42, a switch control port 43, and a system memory 44 via a control bus 45. The serial input port 41 is coupled to the first level shifter 32a and is thus adapted to receive messages being transferred through the data modifying bus buffer 20. Conversely, the serial output port 42 is coupled to the second level shifter 34a and is thus adapted to transmit messages to the second level shifter 34a when the messages are transferred through the data modifying bus buffer 20 via the alternate path. The switch control port 43 is provided to administer control over switches 33a and 33b. System memory 44 may be included to contain executable instructions used by microprocessor 40 as well as for storage of data used by these executable instructions. The memory 44 can include any one or combination of volatile memory elements, such as random access memory (RAM), dynamic random access memory (DRAM), static random access memory (SRAM), and nonvolatile memory elements, such as read only memory (ROM), erasable programmable read only memory (EPROM), electronically erasable programmable read only memory (EEPROM), programmable read only memory (PROM), tape, compact disc read only memory (CD-ROM), disk, diskette, cartridge, or the like. Moreover, the memory 44 may incorporate electronic, magnetic, optical, and/or other types of storage media.

For a data modifying bus buffer 20 of the present embodiment that is implemented on first 21 and second 25 databuses utilizing the MIL-STD-1553 protocol, FIG. 5 shows a timing diagram depicting a sequence of messages through the data modifying bus buffer 20, wherein the sequence of messages includes a message to a peripheral device 13 having a message type indicating a data portion containing roll angle θ information. Row 50 indicates a sequential plurality of messages that are transferred from the mission controller 21 to the peripheral device 13. Row 51 indicates a sequential plurality of messages existing on the second databus 25 and row 52 indicates messages that originate from the remote terminal 13 and are destined for the mission computer 25. The horizontal axis represents the progression of time with specific instances of time denoted by, for example, "t100." From t100 to t101, an arbitrary message 53 comprising a command word is sent from the mission computer 21 to the peripheral device 13. Following issuance of the message 53, the mission computer 21 ensuingly issues another message 54 from t102 to t103 in order to ensure that the prior command word was received properly. At t104 to t105, the peripheral device 13 responds to the mission computer 21 by issuing a status word 55. As shown, the command messages 53, 54, and status message 55 are transferred through the bus buffer 20 generally unimpeded. The aforedescribed sequence of messages indicates a typical flow of messages from the mission computer to the peripheral devices. In this example, neither of the messages comprises a message type corresponding to roll angle θ information and addressed to a particular peripheral device 13 on the second databus 25. Messages such as these will be transferred through the data modifying bus buffer 20 via the original path. In this example, the switch 33a is in the closed position.

From t106 onward indicates a sequence of messages through the data modifying bus buffer 20 that may occur due to the mission computer 21 sending a message comprising roll angle θ information to one particular peripheral device 13. From t106 to t109, the mission controller 21 attempts to issue a message 56 comprising roll angle θ information to the particular peripheral device 13. Because the command word is the first of the plurality of words transmitted with the message, the buffer controller 30 detects the presence of this and thus opens switch 33a. As shown, only a portion of message 56' was transferred to the second databus 25, wherein the portion of the message following the command word has been truncated by switch 33a. It is important to note that message 56' is of no consequence to any peripheral device 13 on the second databus 25 in that the peripheral device 13 will have the necessary intelligence to ignore any message having only a header portion with no appended data portion.

As described previously, the buffer controller 30 is adapted to open switch 33a when a peripheral device 13 is addressed containing roll angle θ information via the RT address and sub-address mode/word count mode code portion of the command word. In this manner, the message is transferred through the data modifying bus buffer 20 using the alternate path, whereby the data portion of the message is modified. In one embodiment, the data portion of the message may be modified by reading the roll angle θ information provided within the original message and calculating an offset value pertinent to the current orientation of the weapon 13 on the triple ejector rack 11. This calculated value is then appended onto the original header portion of the message and transferred to the second databus 25 via output port 42, thereby forming message 57 (t108 to t111).

As a consequence of a typical implementation of the operational flight plan, the mission controller 21 may transmit an ensuing message 58 to the peripheral device 13 requesting a status of the previously sent message 56 from t110 to t113. However, only a portion of the message 58' may be transferred to the second databus 25 due to truncation of the first part thereof (t112 to t113). This truncated message 58' is of no consequence to any peripheral device 13 on the second databus 25 in that the peripheral device 13 will have the necessary intelligence to ignore any status message having a first portion thereof, which has been truncated. Nevertheless, after some arbitrary period of time in which the mission controller 21 has not received a valid response to the status message, the mission controller 21 may issue another status message 59 from t114 to t115 requesting the status of the previously sent message 56 containing roll angle θ information. In response, the peripheral device 13 responds to the mission controller 21 via message 60 during t116 to t117.

The behavior of the data modifying bus buffer 20 as described above may be implemented by executable instructions that are stored in memory 44 and are executable by the buffer controller 30. Moreover, the executable instructions may be implemented by a software program that is written and compiled in any programming language, from which executable instructions suitable for use by the buffer controller 30 may be generated, including C, C++, assembly, JAVA, or the like.

It will be apparent that many modifications and variations may be made to embodiments of the present invention, as set forth above, without departing substantially from the principles of the present invention. For example, although the description as set forth above was directed to modification of a message on a MIL-STD-1553 compliant databus incorporating roll angle information, the data modifying bus buffer 20 may be adapted to modify virtually any type of message that may be transferred between two databuses having a similar protocol. Therefore, all such modifications and variations are intended to be included herein within the scope of the present invention, as defined in the claims that follow.

What is claimed is:

1. A data modifying bus buffer comprising:
   a first databus that is adapted to convey signals having a MIL-STD-1553 protocol;
   a second databus that is adapted to convey the signals having the MIL-STD-1553 protocol;
   a first switch that is configured to selectively couple the first databus to the second databus through an original or an alternate path, wherein the switch is operable to transfer messages via the original path with the switch in a closed position; and
   a buffer controller that is operable to monitor the first databus for the presence of a particular message having an address of a peripheral device coupled to the second databus and a message type such that when the particular message is found, the controller is operable to instruct the first switch couple the first and second databuses via the alternate path;
   wherein the particular message comprises a header portion and a data portion, and
   wherein, in response to identifying the presence of the particular message having the address of a peripheral device and the message type, the buffer controller is operable to modify the data portion of the particular message prior to transferring to the second databus.

2. The data modifying bus buffer of claim 1, wherein the first databus is implemented on a military aircraft.

3. The data modifying bus buffer of claim 1, wherein the second databus is implemented on a weapons pod.

4. A data modifying bus buffer comprising:
   a first databus that is adapted to convey signals having a predetermined protocol;
   a second databus that is adapted to convey the signals having the predetermined protocol;
   a first switch that is configured to selectively couple the first databus to the second databus; and
   a buffer controller that is operable to monitor the first databus for the presence of a particular sequence of the signals in a message having a header and a data portion such that, when the particular sequence of the signals is found in the data portion, the buffer controller is operable to modify the data portion of the message and selectively open or close the first switch.

5. The data modifying bus buffer of claim 4, wherein the first databus is implemented on a military aircraft and the second databus is implemented on a weapons pod.

6. The data modifying bus buffer of claim 4, wherein the protocol is a MIL-STD-1553 protocol.

7. The data modifying bus buffer of claim 4, further comprising:
   a first level shifter that is coupled in between the first databus and the first switch, the first level shifter being configured to convert prespecified voltage levels of the signals to a controller voltage level suitable for use by the buffer controller; and
   a second level shifter that is coupled in between the first switch and the second databus, the second level shifter being configured to convert the controller voltage level to the prespecified voltage level of the signals.

8. The data modifying bus buffer of claim 4, further comprising:
   a second switch that is configured to selectively couple the first databus to the second databus;
   wherein the buffer controller is operable to monitor the second databus for the presence of a second databus sequence of the signals such that when the second databus sequence of the signals is found, the second switch may be selectively opened or closed.

9. The data modifying bus buffer of claim 8, wherein the buffer controller is further operable to open the second switch due to a collision between the signals existing simultaneously on the first and second databus.

10. A data modifying bus buffer comprising:
    a first databus that is adapted to convey signals having a predetermined protocol;
    a second databus that is adapted to convey the signals having the predetermined protocol;
    a first switch that is configured to selectively couple the first databus to the second databus;
    a buffer controller that is operable to monitor the first databus for the presence of a particular sequence of the signals such that, when the particular sequence of the signals is found, the buffer controller is operable to selectively open or close the first switch
    a message that comprises the particular sequence of signals and a data string; and
    wherein the buffer controller is further operable to modify the data string of the message that is conveyed from the first databus to the second databus.

11. The data modifying bus buffer of claim 10, wherein the first databus is a MIL-STD-1553 databus configured on a vehicle, and the second databus is a MIL-STD-1553 databus configured on a weapons pod.

12. The data modifying bus buffer of claim 11, wherein the data string that is modified by the buffer controller is orientational information of the vehicle.

* * * * *